United States Patent [19]

Tsuji et al.

[11] Patent Number: 5,057,914
[45] Date of Patent: Oct. 15, 1991

[54] METHOD OF PROCESSING COLORED IMAGE IN MULTILEVEL GRADATIONS

[75] Inventors: Katsuhisa Tsuji; Masaaki Kogure, both of Tokyo, Japan

[73] Assignee: Ricoh Company, Ltd., Tokyo, Japan

[21] Appl. No.: 267,372

[22] Filed: Nov. 4, 1988

[30] Foreign Application Priority Data

Nov. 5, 1987 [JP] Japan ............................. 62-279860

[51] Int. Cl.⁵ ............................................. H04N 1/46
[52] U.S. Cl. ......................................... 358/78; 358/80
[58] Field of Search ................. 358/75, 78, 80, 298, 358/300

[56] References Cited

U.S. PATENT DOCUMENTS

| 4,058,828 | 11/1977 | Ladd | 358/80 |
|---|---|---|---|
| 4,189,744 | 2/1980 | Stern | 358/75 |
| 4,636,844 | 1/1987 | Sasaki | 358/80 |
| 4,667,250 | 5/1987 | Murai | 358/75 |
| 4,674,861 | 6/1987 | Kawamura | 358/78 |
| 4,689,691 | 8/1987 | Isogai et al. | 358/80 |
| 4,725,828 | 2/1988 | Cowlishaw | 358/78 |
| 4,809,063 | 2/1989 | Moriguchi et al. | 358/75 |
| 4,814,867 | 3/1989 | Tsuda et al. | 358/78 |
| 4,814,891 | 3/1989 | Uchiyama et al. | 358/80 |
| 4,831,409 | 5/1989 | Tatara et al. | |

Primary Examiner—James J. Groody
Assistant Examiner—Kim Yen Vu
Attorney, Agent, or Firm—Oblon, Spivak, McClelland, Maier & Neustadt

[57] ABSTRACT

In processing a colored image in multilevel gradations, a color which does not affect the gradation of the image is processed in fewer multilevels and colors which affect the gradation are processed in an ordinary number of multilevels.

10 Claims, 5 Drawing Sheets

METHOD OF PROCESSING COLORED IMAGE IN MULTILEVEL GRADATIONS

BACKGROUND OF THE INVENTION

1. Field of the Invention

The present invention relates to a method of processing a colored image in multilevel gradations, and more particularly to a method of processing a colored image in multilevel gradations to produce a halftone or intermediate-tone image through a multilevel area gradation process employing multiple thresholds.

2. Description of the Prior Art

Various digital colored image forming processes used in color copying machines, color printers, color printing technology, and the like carry out a multilevel area gradation process employing multiple thresholds for producing a halftone or intermediate-tone image by using a plurality of colors. According to such a method of processing a colored image in multilevel gradations, the more multilevels are used, the better the gradation and hence the greater the quality of a colored image.

If the number of multilevels used is increased in order to improve the gradation, the processor required to process the image would be rendered complex, resulting in an increased number of processing circuits and a higher cost. For example, signals indicative of four colors such as yellow, magenta, cyan, and black may be processed in three bits with 8 levels, and signals representing these four colors may be processed in two bits with 4 levels. The ratio of the cost of former process to the cost of the latter process is 3 : 2. If the number of multilevels used is reduced, the cost of the process would be lowered, but the quality of a resulting colored image would also be lowered. Therefore, the number of gradations should not be excessively lowered in order to maintain a certain desired image quality.

SUMMARY OF THE INVENTION

It is an object of the present invention to provide a method of processing a colored image in multilevel gradations, the method employing a reduced number of multilevels or memory bits so that the circuit employed to carry out the method is simplified and of a reduced cost and the image can be processed quickly without impairing the quality of the image.

To achieve the above object, there is provided in accordance with the present invention a method of processing a colored image in multilevel gradations in a digital image forming system for producing a halftone image using a plurality of colors through a multilevel area gradation process employing multiple thresholds, the method comprising the step of employing fewer multilevels for one of the colors than those for the other colors.

According to the above method, a color which does not affect the quality of the image is processed in a reduced number of multilevels, and colors which affect the quality of the image are processed in multilevels which are not reduced in number.

The above and other objects, features and advantages of the present invention will become more apparent from the following description when taken in conjunction with the accompanying drawings in which a preferred embodiment of the present invention is shown by way of illustrative example.

DETAILED DESCRIPTION

Prior to describing the present invention in detail, a gradation number (the number of gradations) will be described below. A gradation number signifies a range of lightnesses in each color. Color has three qualities, i.e., brightness, hue, and saturation.

The hue of a color is determined by a combination of amounts attached of yellow, magenta, and cyan, for example. The amount attached of each of these colors depends on the numerical ratios of color separation signals from a scanner or the like, and is determined by the matrix size of a dithered process and the number of multilevels corresponding to one pixel in a matrix circle. For example, where a 4×4 matrix and 4 levels are given, 4×4×4 (levels)×3 (colors)=192 hues are available, and where a 4×4 matrix and 8 levels are concerned, 4×4×8 (levels) ×3 (colors)=384 hues are available. A color can sufficiently be reproduced with 192 hues in 4 levels. In the case of area gradation, moreover, lightness as well as hue is varied dependent on the ratio to a white background. The saturation of a color represents the ratio of a dominant wavelength of each color to white. With respect to an image made up of yellow, magenta, and cyan, for example, since the spectral reflectivity of each color is wide, it is difficult and also practically meaningless to control the saturation itself. Apparent saturation can however be adjusted by lightness, i.e., the ratio of amounts attached of respective colors.

From the above considerations with respect to the hue and saturation, it can be understood that gradation is largely representative of a number of steps of lightness.

The lightness indicates a varying series of brightnesses. Since a recording sheet is white in color, the lightness of a color is varied by the ratio at which it is covered with each color toner. Because each color toner has a certain lightness itself, however, the lightness is not greatly varied even with the ratio of coverage being 100 %. If the amount attached of black such as black toner can be controlled, then the dynamic range of varying lightness can be increased, making four-color reproduction useful.

Gradation is substantially represented by varying lightness, which in turn depends on the gradation number of the amount attached of black, e.g., black toner.

According to a UCR (under-color removal) process in which equal amounts of toners of yellow, magenta, and cyan are replaced with a black toner, black greatly governs lightness. The UCR process determines the amount attached of a black toner, and this means a process in which lightness information is removed from a color on a subject, the hue of the color is expressed by the differences between the amounts attached of yellow, magenta, and cyan toners, and the lightness of the color is represented instead by the amount attached of a black toner.

Heretofore, 3 bits and 8 levels have been employed to process four colors, i.e., yellow, magenta, cyan, and black. However, sufficient gradation can also be obtained by processing black in 3 bits and yellow, magenta, and cyan in 2 bits. The ratio of the cost of this alternative process to the cost of the conventional process is given by $(3-2)/3 \times (4-1)4 = \frac{1}{3} \times \frac{3}{4} = \frac{1}{4}$. Thus, the cost of a processing circuit required is reduced to $\frac{1}{4}$.

A processing circuit as a means for increasing the number of levels for a Bk (black) component which greatly influences the resolving power of characters or the like will be described below.

Figure 1:
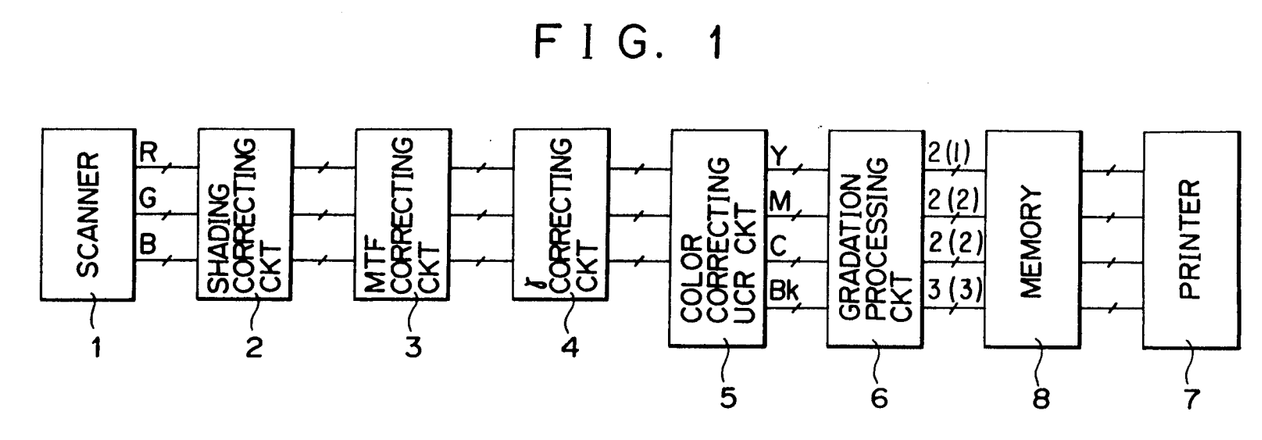
FIG. 1 is a block diagram of a copying system employing a method of the present invention.
Figure 2:
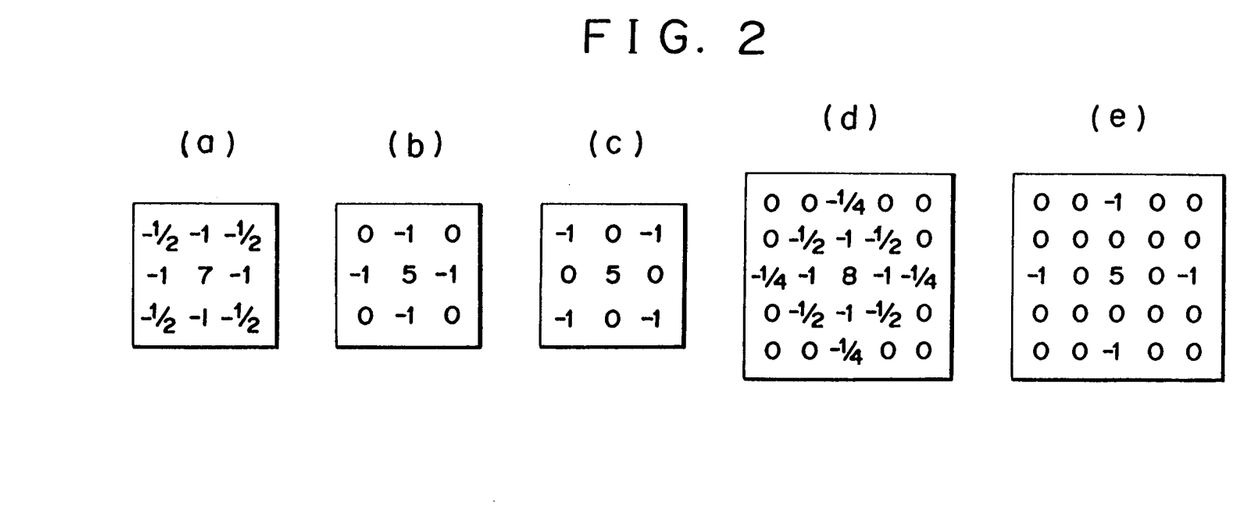
FIG. 2 comprising (a) through (e) are views explaining digital filters for use in MTF (modulation transfer function) correction.

FIG. 1 shows in block form a copying system employing a method of the present invention. A subject or original to be copied is read and separated into R, G, B by a scanner 1. A shading correcting circuit 2 corrects sensitivity irregularities of an imaging device, illumination irregularities of a light source, and other fluctuations. An MTF (modulation transfer function) correcting circuit 3 serves to correct deterioration of MTF characteristics of the input system particularly in a high-frequency range. Digital filters for use in such MTF correction are shown in FIGS. 2(a) through 2(e) by way of example. A γ correcting circuit 4 corrects or converts the input data so that they have desired characteristics such as linear reflectivity, linear density, and the like. The γ correcting circuit 4 also effects background skipping. A color correcting UCR circuit 5 serves to correct the difference between the color separation characteristics of the input system and the spectral characteristics of color materials of a output system. The color correcting UCR circuit 5 comprises a color correcting processor for calculating the amounts of color materials such for example as yellow, magenta, and cyan required to effect correct color reproduction, and a UCR processor for replacing an area where yellow, magenta, and cyan overlap each other with black.

The color correction can be achieved by carrying out the following matrix calculation:

$$\begin{pmatrix} Y \\ M \\ C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} \overline{B} \\ \overline{G} \\ \overline{R} \end{pmatrix}$$

where $\overline{B}, \overline{G}, \overline{R}$ represent correcting numbers for B, G, R, respectively. Matrix coefficients $a_{ij}$ are determined by the spectral characteristics of the input system and the output system (color materials). While a primary masking equation is given above by way of example, terms of second degree such as $B^2$ and B·G or terms of higher degree may be employed for color correction of higher accuracy. A different equation may be used or the Neugebauer's equation may be used dependent on the hue. At any rate, the values of Y, M, C can be determined from the values of $\overline{B}, \overline{G}, \overline{R}$ or B, G, R.

Figure 3:
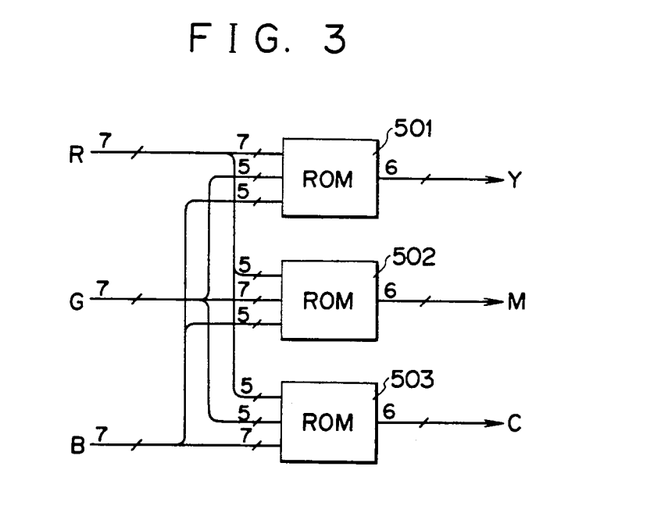
FIG. 3 is a block diagram of a color correcting circuit.

FIG. 3 shows a color correcting circuit by way of example, the circuit employing ROM tables. More specifically, the amounts of Y, M, C required for reproducing colors expressed by R, G, B are calculated beforehand, and the calculated amounts are written in ROMs 501, 502, 503, respectively, so that colors can be corrected by referring to the tables in the ROMs. Since complementary colors most contribute to color correcting calculations, the capacities of the ROMs can be reduced, without impairing the accuracy of the calculations, by reducing the number of bits of the other colors with respect to the number of bits of the complementary colors. In the arrangement of FIG. 3, the complementary colors are in 7 bits and the other colors are in 5 bits×2. Corrected data of 6 bits can be obtained by addressing the ROMs with data of a total of 17 bits. Each of the ROMs may be 1-megabit ROM with one word represented by 8 bits. A plurality of small-capacity ROMs of 256 kilobits may alternatively be employed.

The UCR process described above is carried out by effecting the following calculations:

$$Y' = Y - \alpha \, min(Y, M, C)$$

$$M' = M - \alpha \, min(Y, M, C)$$

$$C' = C - \alpha \, min(Y, M, C)$$

$$Bk = \alpha \, min(Y, M, C)$$

where $\alpha$ is a coefficient for determining the amount of UCR. when $\alpha = 1$, the UCR process is performed 100 %. The coefficient $\alpha$ may be of a fixed value or may be varied dependent on the density level. For example, by selecting $\alpha$ to be 1 in a high-density area and to be close to 0 in a highlight area, the image in the highlight area may be made smooth.

Figure 4:
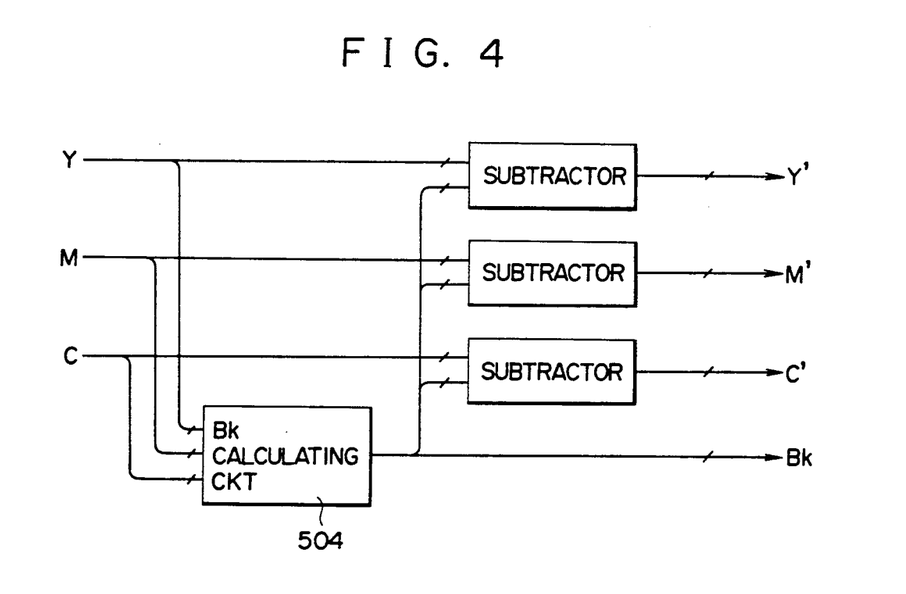
FIG. 4 is a block diagram of a UCR (under-color removal) circuit.
Figure 5:
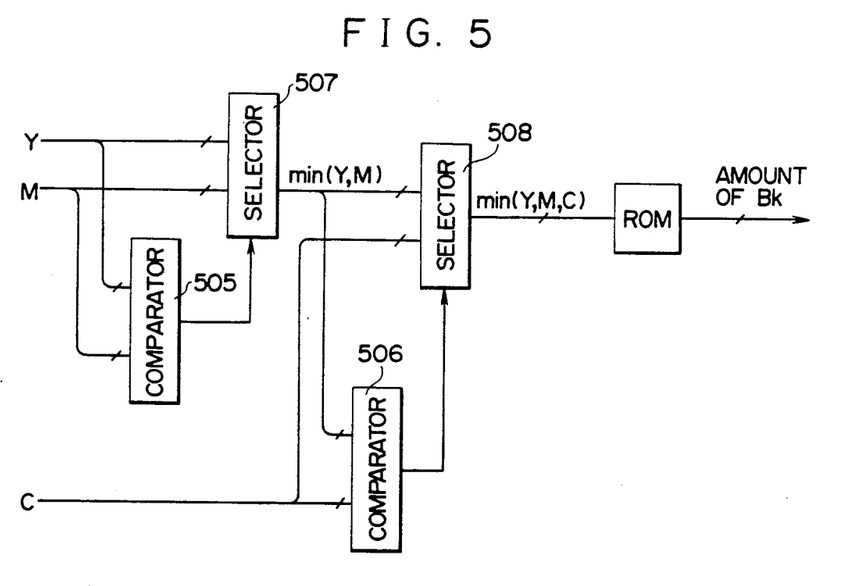
FIG. 5 is a block diagram of a circuit for calculating an amount of Bk (black)

FIG. 4 shows a UCR circuit by way of example. From the data on Y, M, C after being corrected, there are subtracted data corresponding to the amount of Bk which is calculated by a Bk calculating circuit 504. FIG. 5 illustrates the Bk calculating circuit 504 by way of example. In FIG. 5, minimum values of Y, M, C are determined by comparators 505, 506 and selectors 507, 508, and the amount of Bk is determined by referring to the ROM tables dependent on the value of $\alpha$ as described above. While the UCR process is performed after the color correction in the illustrated embodiment, a color correcting process may be effected by calculating the amount of Bk from the minimum values of $\overline{R}, \overline{G}, \overline{B}$ and employing the values obtained by subtracting Bk from $\overline{R}, \overline{G}, \overline{B}$.

Figure 6:
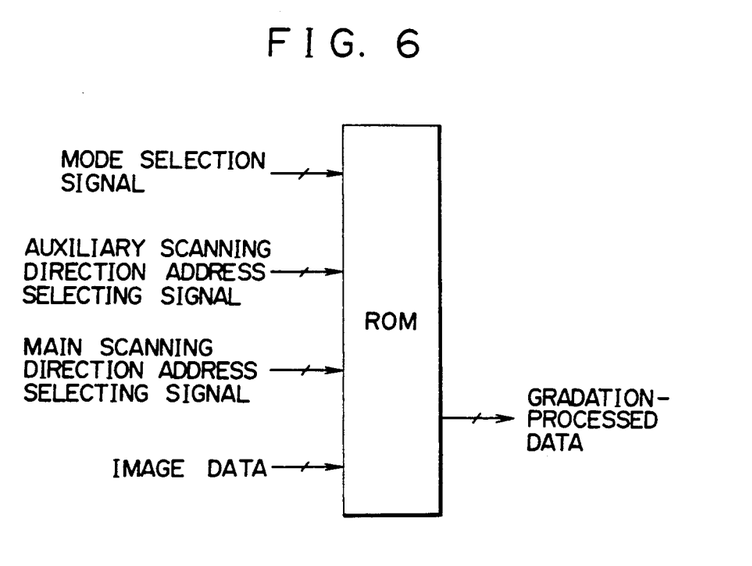
FIG. 6 is a block diagram of a multilevel processing circuit based on a systematic dithered process.

Referring back to FIG. 1, the data of Y, M, C, Bk which have been corrected in color and subjected to the UCR process are converted or processed into two or more values or levels by a gradation processing circuit 6. The systematic dithered process is generally employed as such a multilevel processing method, but other methods such as the error dispersion method may also be employed. According to the present invention, Bk is processed in more levels than those for Y, M, C since greater importance is attached to gradations of Bk. In the illustrated embodiment, Bk is processed in 8 levels (3 bits/pel), and Y, M, C are processed in 4 levels (2 bits/pel). As parenthetically shown in the alternate in FIG. 1, in another preferred embodiment, Bk is processed in 8 levels (3 bits/pel), M and C are processed in 4 levels (2bits/pel) and Y is processed in 2 levels (1 bit/pel). Dependent on the quality of an image desired, Bk may be processed in 8 levels whereas Y, M, C may be processed in 2 levels. FIG. 6 shows a circuit for processing the color data in multilevels according to the systematic dithered process. By writing processed data in advance at memory addresses which can be accessed by addresses of a dither matrix and image data, the color data can be subjected to the dithered process by referring to the data table. The circuit shown in FIG. 6 is provided for each of Y, M, C, Bk. The color data are thus processed in parallel so that high-speed gradation processing may be carried out.

Figure 7:
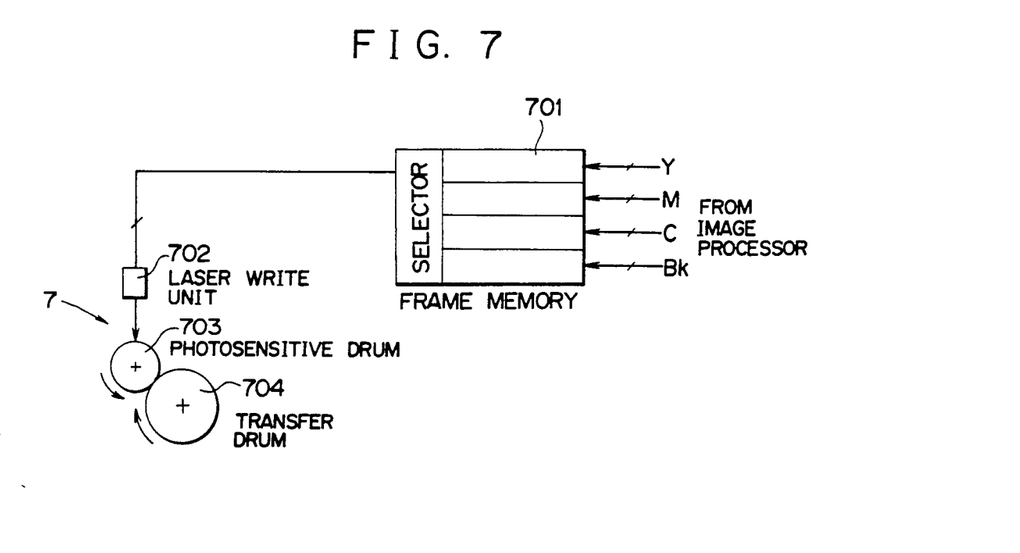
FIG. 7 is a schematic view of a printer which employs one photosensitive drum.

The data which are processed in gradations are then sent to a printer 7 for producing a reproduced image. Where the output system employs a laser printer, the processed data are not directly sent to the printer, but are indirectly sent to the printer through a memory 8. FIG. 7 shows a printer having one photosensitive drum. The data of Y, M, C, Bk which have been processed in parallel by the image processor are stored in a frame memory 701, then read successively one color at a time from the memory, and delivered to a laser write unit 702, for example, of the printer 7. A toner image formed on a photosensitive drum 703 according to the image data is then transferred to a recording sheet wound around a transfer drum 704. The recording sheet remains wound around the transfer drum 704 until all four color images are transferred. The color data which should be fed first to the printer 7 may be directly applied to the printer 7 through passing through the memory 8.

Conventionally, since all color data of Y the alternate embodiment illustrated parenthetically in FIG. 1, M, C, Bk are processed in gradations at 3 bits/pel, when an A4-size subject is processed at a sampling density of 16 lines/mm, a frame memory of about 45 megabits/color is required, and hence a memory capacity of 192 megabits is required for four colors. According to the present invention, each of Y, M, C is processed in gradations at 2 bits/pel, and the required memory capacity is 144 megabits ($=48$ megabits $\times (\frac{2}{3}) \times 3 + 48$ megabits), which are 25 % ($=0.25=(192-144)/192$) smaller than the conventional memory capacity required. Where the data of the first color are not passed through the frame memory, 144 bits ($=48$ megabits/color $\times 3$ colors) are required heretofore. According to the present invention, if Bk requiring many bits is the first color, then 96 megabits ($=48$ megabits/color$\times(\frac{2}{3})\times 3$) are required which are 33 % ($=0.33=(144-96)/144$) are smaller than the conventionally required bits.

Figure 8:
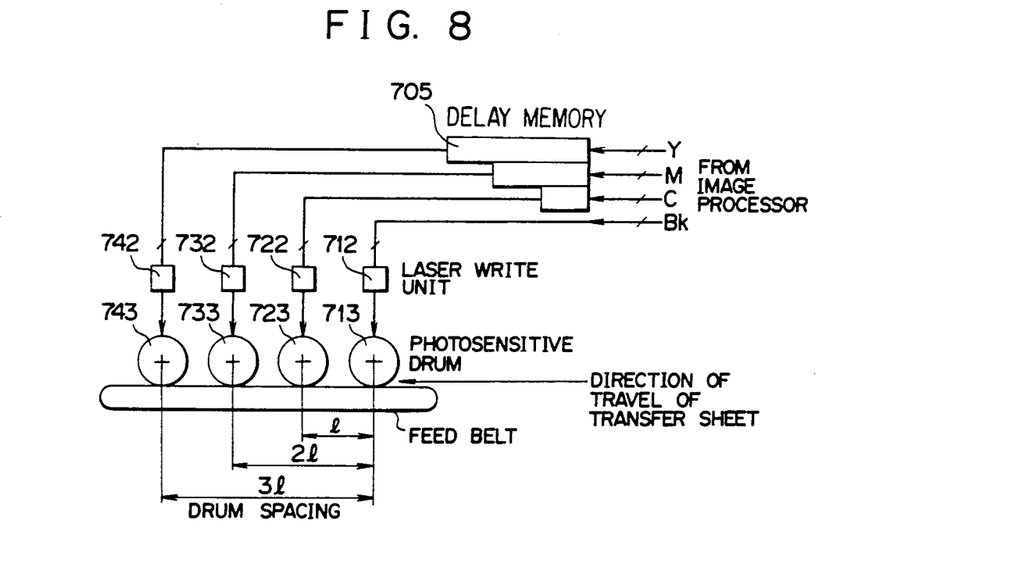
FIG. 8 is a schematic view of a printer having four photosensitive drums.

FIG. 8 shows a printer having four photosensitive drums for producing images of respective colors independently to reproduce a colored image at a high speed. While the data of four colors are issued in parallel, since printed colors would be displaced at intervals equal to those at which the drums 713, 723, 733, 743 are spaced, it is necessary to employ a delay memory 705 for delaying data transfer to laser write units 722, 732, 742 for time periods corresponding to the intervals at which the drums 713, 723, 733, 743 are spaced, in order to eliminate the spacings of the respective color images. The delay memory 705 should be of a capacity corresponding to 6l ($=l+2l+3l$) where l (mm) is the distance between two adjacent drums. If l is 100 mm, the sampling density is 16 lines/mm, and an A4-size transfer sheet is fed laterally (with its width in the main scanning direction being 297 mm), then the delay memory 705 is of a memory capacity of 137 megabits ($=(297$ mm$\times 16$ lines/mm$)\times (100$ mm$\times 6\times 16$ lines/mm$)\times 3$ bits). With the present invention, where the first color is Bk of many bits, since data corresponding to 6l may be delayed in 2 bits, the delay memory 705 may be of a capacity of 91 megabits ($=(297$ mm$\times 16$ lines/mm$)\times(100$ mm$\times 6\times 16$ lines/mm$)\times 2$ bits), which is 33 % ($0.33=(137-91)/137$) smaller than the memory capacity which would otherwise be required.

In the above embodiment, Bk is processed in 3 bits and Y, M, C are processed in 2 bits. However, the memory capacity required may be further reduced by processing Y, M, C in 1 bit. Where Bk is processed as the first color, no frame memory and no delay memory therefor are needed, and the cost of the required memories is not increased even by increasing the number of levels for Bk.

The Bk data versus the Y, M, C data have been described above. Now, characteristics required between the Y, M, C data will be described below. Where gradations are to be expressed by the systematic dithered process, if the dither matrix used is increased in size, the number of gradations is increased, but the resolution is lowered. Conversely, if the matrix is reduced in size, the gradation is lowered. The gradation can be increased even if the matrix size is not increased by employing multilevels. However, since the amount of data is increased, the capacity of the buffer memory is increased. The above embodiment is directed to an increase in the number of multilevels for only the Bk data which largely influence the resolution of characters or the like. Conversely, the number of levels for those data which less influence the resolution of characters or the like may be reduced.

Recent years have seen more and more colored image information, and more characters and linear images which are colored not only in black but also in red, blue, green, etc. are used in general. Therefore, it is necessary to maintain a desired level of resolution for color components. Y component, among Y, M, C components, is visually less conspicuous and has lower resolution. Therefore, the number of levels for Y may be smaller than those for C, M. Characters in green and red are reproduced by superposing C and Y plates and superposing M and Y plates, respectively. It is possible to recognize green or red characters if they are reproduced such that the resolution for C and M is higher, even if the resolution for Y is lower.

A memory capacity required when the amount of processed data (bits per pel) is 3 bits for Bk, 2 bits for each of M and C, and 1 bit for Y will be calculated below. For a printer with one photosensitive drum, if Bk is the first color, then the required memory capacity is 80 megabits ($=(297$ mm$\times 16$ lines/mm$)\times(210$ mm$\times 16$ lines/mm$)\times(2+2+1)$ bits), which is 17 % ($=0.17=(96-80)/96$) lower than 96 megabits which would be required if the data amount were 3 bits for Bk and 2 bits for each of Y, M, C. For a printer with four photosensitive drums, if Bk is the first color and Y is the fourth color, the capacity of the buffer memory is minimized, i.e., 68 megabits ($=(297$ mm$\times 16$ lines/mm$)\times(100$ mm$\times 16$ lines/mm$)\times(1\times 2+2\times 2+3\times 1)$ bits), which is 25 % ($=0.25=(91-68)/91$) lower than 91 megabits which would be required if the data amount were 3 bits for Bk and 2 bits for each of Y, M, C. Where the data amount is 3 bits for each of Bk, M, C and 1 bit for Y to improve the quality of color characters, the memory capacity required is 91 megabits (=(297 mm×16 lines/mm)×(100 mm×16 lines/mm)×(1×3+2×3+3×1) bits), which is equal to the memory capacity which would be required if the data amount were 3 bits for Bk and 2 bits for each of Y, M, C. Thus, the capacity of the memory required can be reduced without lowering the image quality by reducing the number of bits (the number of multilevels) for Y.

For transmitting data to an external device such as a facsimile device or filing data in an external storage device, the amount of data for Bk should also be considered. The amount of data can greatly be reduced by employing 3 bits for Bk and 1 bit for each of Y, M, C or 2 bits for Bk and 1 bit for each of Y, M, C while neglecting slight degradation of the image quality. In a system for not only forming or copying an image but also transmitting or storing image data, a plurality of operation modes are provided which include a copying mode that requires higher image quality and in which Bk is processed in 3 bits and each of Y, M, C is processed in 2 bits, and a transmission/storage mode that requires higher efficiency and in which Bk is processed in 2 bits and each of Y, M, C is processed in one bit. In the transmission/storage mode, Bk may be processed in 3 bits and each of Y, M, C may be processed in 1 bit, or alternatively Bk may be processed in 3 bits and each of Y, M, C may be processed in 2 bits. In this case, processing conditions (indicating a gradation number, an image size, and the like) may be assigned as a header to image data, so that an image can be reproduced without error when reading out received or stored data.

Figure 9:
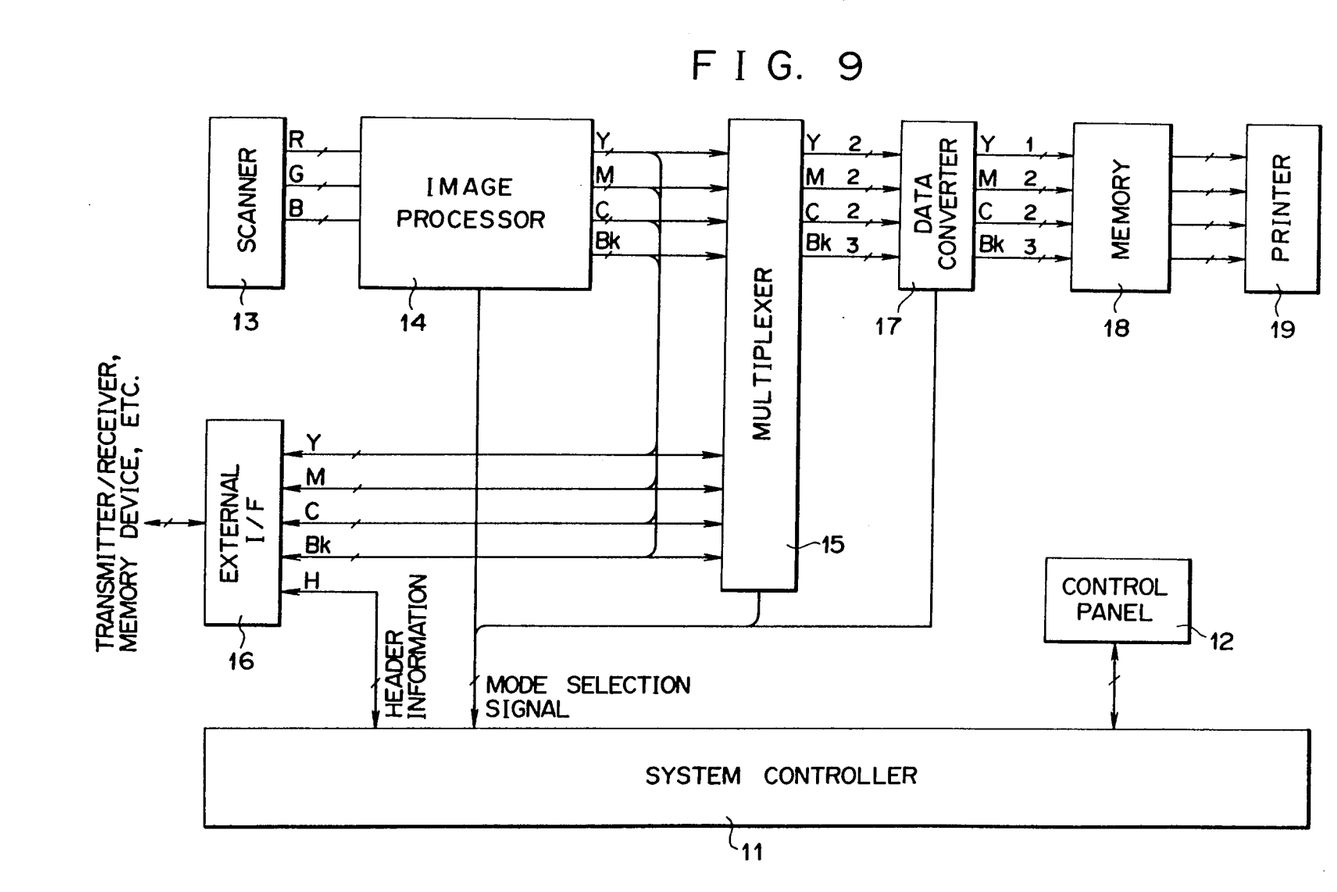
FIG. 9 is a block diagram of a copying system having a copying mode.

FIG. 9 shows in block form a copying system having a copying mode. The illustrated copying system is controlled by a system controller 11 comprising a CPU. The operator of the copying system can specify a mode and processing conditions through switches (not shown) on control panel 12.

In the copying mode which employs an internal scanner, a scanner 13 is energized to read and separate a subject in R, G, B, and the read color data are processed for shading correction, MTF correction, γ correction, color correction, and UCR by an image processor 14, and processed into multilevels by the gradation processing circuit illustrated in FIG. 6. At this time, Bk is converted into multilevels of 3 bits and each of Y, M, C is converted into multilevels of 2 bits according to a mode selection signal from the system controller 11. A multiplexer 15 selects data from the internal scanner 13 or data sent through an external I/F 16. In the copying mode, image data transmitted from the internal scanner 13 are selected. A data converter 17 serves to convert data of different bits (multilevels) applied from an external source into 3-bit data for Bk, 2-bit data for each of M and C, and 1-bit data from Y in order to match the characteristics of an output system. Such data conversion is effected by addressing a table in a ROM or a RAM with the image data and the mode selection signal. The output data from the data converter 17 are delivered through a memory 18 to a printer 19 which produces a reproduced image.

In a reception mode, image data transmitted from an external transmitter are received according to header information, processed by the multiplexer 15, the data converter 17, and the memory 18, and reproduced into an image by the printer 19. In the reception mode, the header information is first received through a signal line H and analyzed by the system controller 11. The system controller 11 generates a mode selection signal according to the header information. The image data which are applied following the header information are supplied to the data converter 17 via the multiplexer 15, and then converted into image data of prescribed bits according to the mode selection signal. The image data are then fed to the printer 19. In this mode, the system controller 11 controls the scanner 13 so that it is not operated. In a transmission mode, the internal scanner 13 is operated, as with the copying mode, to read and separate a subject into R, G, B, and the color data are processed for shading correction, MTF correction, γ correction, color correction, and UCR by the image processor 14, and processed into multilevels by the gradation processing circuit illustrated in FIG. 6. At this time, the data are processed into bits (multilevels) according to processing conditions selected by the operator through the control panel 12. The system controller 11 transmits the processing conditions as header information prior to the image data, and thereafter transmits the image data which have been processed in gradations. At this time, the printer 19 is controlled so as not to be operated. Exchange of data between the external I/F 16 and an external memory device is basically the same as in the reception mode.

With the aforesaid embodiment, as described above, Y, M, C components of a colored image are processed in fewer bits than the Bk component of the colored image, so that the amount of data required is reduced while keeping high image quality. As a result, a frame memory and a delay memory can be eliminated, and operation time and memory capacity can be reduced in transmitting and storing image data. The operation time and memory capacity may be further reduced in transmitting and storing image data by employing a variable number of multilevels for gradataion processing. By increasing the number of bits for Bk, the gradation as well as the resolution of black characters can be improved. The cost of a write system is lowered since a control circuit for write units for Y, M, C is simpler than that for Bk.

While the above embodiment is directed to a system employing a laser printer, the present invention is also applicable to a system which includes any of various other output devices such as a thermal head printer employing one head or plural heads. The present invention is not limited to a full 4-color copying system, but may be applied to a red-black copying system in which black is processed in more bits and red is processed in fewer bits. By reducing the number of bits used for processing a certain color in gradations in a system for reproducing an image in a plurality of colors, the amount of data required can be reduced without lowering the quality of a reproduced image.

The principles of the present invention are applicable to not only a system employing a matrix of a fixed size (e.g., a 4×4 matrix) but also a system employing a variable matrix size for keeping a reproduced gradation number constant. More specifically, where a matrix of a fixed size is used, the number of reproduced gradations varies dependent on the number of bits employed. Since the resolution of an image is determined by a matrix size, the smaller the matrix size, the higher the resolution of an image reproduced. It is known that since human eyes are less responsive to the color of yellow, the quality of a reproduced image is not lowered even by lowering resolution of yellow, and that the data of yellow require a delay memory as shown in FIG. 3. Therefore, the data of yellow may be represented by 2 bits rather than 3 bits to reduce the cost of a required memory which is very expensive.

Although a certain preferred embodiment has been shown and described, it should be understood that many changes and modifications may be made therein without departing from the scope of the appended claims.

What is claimed is:

1. A method of processing of colored image in multilevel gradations in a digital image forming system for producing a halftone image using a plurality of colors through a multilevel area gradation process, said method comprising the steps of:
    producing multilevel gradation process data for data of different colors derived from said colored image;
    employing fewer multilevels for the process data of one of the colors than those for the other colors so as to reduce the capacity required of a delay memory; and
    storing the multilevel data of said colorant data in said delay memory.

2. A method according to claim 1, wherein said colors comprise yellow, magenta, cyan, and black, the multilevels for the yellow being fewer than those for the other colors.

3. A method of processing a colored image in multilevel gradations in a digital image forming system for producing a halftone image using a plurality of colors through a multilevel area gradation process, said method comprising the step of:
    employing fewer multilevels for one of the colors than those for the other colors;
    wherein said colors comprise yellow (Y), magenta (M), cyan (C), and black (Bk), the multilevels for Y being fewer than those for the other colors, and
    wherein M, C, Bk are processed in more than 3 bits, and Y is processed in 2 bits.

4. A method of processing a colored image in multilevel gradations in a digital image forming system for producing a halftone image using a plurality of colors through a multilevel area gradation process, said method comprising the step of:
    employing fewer multilevels for one of the colors than those for the other colors;
    wherein said colors comprise yellow (Y), magenta (M), cyan (C), and black (Bk), the multilevels for Y being fewer than those for the other colors, and
    wherein Bk is processed in 4 bits, M and C are processed in 2 bits, and Y is processed in 1 bit.

5. A method of processing a colored image in multilevel gradations in a digital image forming system for producing halftone image using a plurality of colors through a multilevel area gradation process, said method comprising the step of:
    varying multilevel color data for the color gradations of each pixel according to a ROM table, and
    employing fewer multilevels for one of the colors than those for the other colors,
    wherein color data from said ROM table are stored in a frame memory for every pixel with fewer multilevels being used for one of the colors relative to the other of said colors so as to reduce the capacity of the frame memory, and said multilevel color data are output from said frame memory for every color by a selector.

6. A method according to claim 5, wherein one photosensitive member is provided and said data output from said frame memory by said selector are used to modulate a laser beam exposed onto said photosensitive member.

7. A method of processing a colored image in multilevel gradations in a digital image forming system for producing halftone image using a plurality of colors through a multilevel area gradation process, said method comprising the step of:
    varying multilevel color data for the color gradations of each pixel according to a ROM table, and
    employing fewer multilevels for one of the colors than those for the other colors;
    wherein a plurality of photosensitive members are provided, and data output from said ROM table are used to modulate beams successively exposed onto at least one more than one of said photosensitive members via a delay memory.

8. A method according to claim 7, wherein said delay memory delays data transfer for time periods corresponding to the intervals at which respective photosensitive members are spaced according to the photosensitive member at the most upstream side of the transfer sheet feeding direction.

9. A method according to claim 8, wherein color data whose multilevels are decreased are subject to laser beam modulation and are exposed onto the photosensitive member at the most downstream side of the transfer sheet feeding direction.

10. A digital color image forming device for processing a colored image in multilevel gradations by the use of fewer multilevels for one of the colors than those for the other colors, which digital color image forming device comprises:
    an original image reading means for reading an original image and separating the colors of the original image;
    a color correcting means for processing read image signals (R, G, B) into color separation colorant memory data (Y, M, C Bk);
    a gradation processing means for performing multilevel area gradation processing of the data from said color correcting means;
    a delay memory for delaying transfer of gradation process data according to the number of pixels of each colorant; and
    an exposing means for laser-modulating the data from said delay memory and exposing laser-modulated signals onto a photosensitive member.

* * * * *